(12) United States Patent
You et al.

(10) Patent No.: US 12,471,050 B2
(45) Date of Patent: Nov. 11, 2025

(54) WIRELESS COMMUNICATION METHOD FOR REGISTRATION PROCEDURE

(71) Applicant: ZTE Corporation, Guangdong (CN)

(72) Inventors: Shilin You, Guangdong (CN); Jiyan Cai, Guangdong (CN); Yuze Liu, Guangdong (CN); Jin Peng, Guangdong (CN); Wantao Yu, Guangdong (CN); Zhaoji Lin, Guangdong (CN)

(73) Assignee: ZTE Corporation, Guangdong (CN)

( * ) Notice: Subject to any disclaimer, the term of this patent is extended or adjusted under 35 U.S.C. 154(b) by 542 days.

(21) Appl. No.: 17/739,651

(22) Filed: May 9, 2022

(65) Prior Publication Data
US 2022/0279471 A1 Sep. 1, 2022

Related U.S. Application Data

(63) Continuation of application No. PCT/CN2019/116687, filed on Nov. 8, 2019.

(51) Int. Cl.
| | |
|---|---|
| *H04W 60/04* | (2009.01) |
| *H04W 12/03* | (2021.01) |
| *H04W 12/0431* | (2021.01) |
| *H04W 12/06* | (2021.01) |
| *H04W 84/04* | (2009.01) |

(52) U.S. Cl.
CPC .......... *H04W 60/04* (2013.01); *H04W 12/03* (2021.01); *H04W 12/0431* (2021.01); *H04W 12/06* (2013.01); *H04W 84/042* (2013.01)

(58) Field of Classification Search
CPC ..... H04W 60/04; H04W 60/00; H04W 12/03; H04W 12/0431; H04W 12/06; H04W 12/02; H04W 12/108; H04W 12/126; H04W 12/033; H04W 84/042
See application file for complete search history.

(56) References Cited

U.S. PATENT DOCUMENTS

| | | | |
|---|---|---|---|
| 2004/0193891 A1* | 9/2004 | Ollila | H04W 12/02 |
| | | | 713/182 |
| 2015/0092701 A1* | 4/2015 | Horn | H04W 4/50 |
| | | | 370/329 |

(Continued)

FOREIGN PATENT DOCUMENTS

| | | |
|---|---|---|
| CN | 101977383 A | 2/2011 |
| CN | 104754556 A | 7/2015 |

(Continued)

OTHER PUBLICATIONS

International Search Report and Written Opinion received for Application No. PCT/CN2019/116687 mailed Aug. 3, 2020 (8 pages).

(Continued)

*Primary Examiner* — Kevin T Bates
*Assistant Examiner* — Hector Reyes
(74) *Attorney, Agent, or Firm* — Crowell & Moring LLP (57) ABSTRACT

The present disclosure relates to a wireless communication method, systems and devices for a registration procedure. The wireless communication method for use in a wireless terminal includes determining a concealed identifier based on a permanent identifier and a check value. A message with the concealed identifier for a registration procedure is transmitted to a wireless network node.

16 Claims, 6 Drawing Sheets

(56) References Cited

U.S. PATENT DOCUMENTS

| | | | |
|---|---|---|---|
| 2018/0331830 A1* | 11/2018 | Jerichow | H04W 12/35 |
| 2019/0098502 A1 | 3/2019 | Torvinen et al. | |
| 2020/0344678 A1* | 10/2020 | Kunz | H04W 48/14 |
| 2021/0092603 A1* | 3/2021 | Yang | H04W 12/069 |
| 2021/0185523 A1* | 6/2021 | Targali | H04W 12/0471 |
| 2022/0116777 A1* | 4/2022 | Phan | H04W 12/041 |
| 2022/0279471 A1 | 9/2022 | You et al. | |

FOREIGN PATENT DOCUMENTS

| | | |
|---|---|---|
| CN | 108632231 A | 10/2018 |
| CN | 110035433 A | 7/2019 |
| CN | 111133728 A | 5/2020 |
| EP | 4055859 A1 | 2/2024 |
| WO | WO 2004/088919 A1 | 10/2004 |
| WO | WO 2019/139033 A1 | 7/2019 |
| WO | WO 2021/087973 A1 | 5/2021 |

OTHER PUBLICATIONS

Examination Report received for Canada Application No. 3,156,911 mailed Feb. 27, 2024 (3 pages).

First Examination Report received for India Application No. 202227026373 mailed Feb. 20, 2024 (7 pages).

Extended European Search Report received for Application No. EP 19951772.3 mailed Sep. 28, 2022 (10 pages).

3rd Generation Partnership Project, Technical Specification Group Services and System Aspect; Security Architecture and Procedures for 5G System (Release 16) 3GPP TS 33.501, vol. SA WG3, No. V16.0.0, Sep. 25, 2019 (196 pages) (uploaded for filing in four sections due to document size).

3rd Generation Partnership Project; Technical Specification Group Services and System Aspects; System Architecture for the 5G System (5GS); Stage 2 (Release 16), vol. SA WG2, No. V16.2.0, Sep. 24, 2019 (391 pages) (uploaded for filing in eight sections due to document size).

Communication for European Application No. 19 951 772.3 dated Jan. 10, 2025 (5 pages).

Office Action for China Patent Application No. 201980100782.7 dated Dec. 31, 2024 (15 pages).

Notice of Allowance issued for the Korea Patent Application No. 10-2022-7018355 (7 pages).

Office Action received for Korean Patent Application No. 10-2022-7018355 mailed Jun. 18, 2024 (4 pp.).

\* cited by examiner

WIRELESS COMMUNICATION METHOD FOR REGISTRATION PROCEDURE

PRIORITY

This application claims priority as a Continuation of PCT/CN2019/116687, filed on Nov. 8, 2019, entitled "WIRELESS COMMUNICATION METHOD FOR REGISTRATION PROCEDURE", published as WO 2021/087973 A1, the entirety of the above application is incorporated herein by reference.

TECHNICAL FIELD

This document is directed generally to wireless communications.

BACKGROUND

Wireless communication technologies are moving the world toward an increasingly connected and networked society. 5G system applies the ECIES (Elliptic Curve Integrated Encryption Scheme) to conceal the SUPI (Subscription Permanent Identifier) so that an attacker is unable to obtain the SUPI. An adversary could launch a SUPI guessing attack to ascertain whether a guessed SUPI is valid or not in the network. The reason for this is that the network responds to a Registration Request message in a different way considering whether the SUPI is valid or not. As a result, the adversary could figure out the whole SUPI database to a dedicated network by repeating the SUPI guessing attack several times. Furthermore, the adversary could determine whether a genuine SUPI (the guessed SUPI is verified) belongs to a dedicated victim or not. This is achieved by forwarding the Authentication Request message to the victim and observing the message type of victim's response.

This document generally relates to methods, systems, and devices for wireless communication, in particular for registration procedures. However, it is clear for the skilled person that the present document is not limited to these wireless communications but is also applicable to other types of wireless communications.

The present disclosure relates to a wireless communication method for use in a wireless terminal, comprising: determining a concealed identifier based on a permanent identifier and a check value; and transmitting, to a wireless network node, a message comprising the concealed identifier for a registration procedure.

Various embodiments may preferably implement the following features:

A cipher value text of the concealed identifier may be determined based on the check value.

The cipher value text of the concealed identifier may be an encryption of a mobile subscriber identification number, MSIN, of the wireless terminal and the check value.

The permanent identifier may be a subscription permanent identifier.

The check value may be a check value of verifying one of an International mobile subscriber identity, IMSI, of the wireless terminal or a mobile subscriber identification number, MSIN, of the The wireless communication method may further comprise updating the check value by using a unified data management control plane procedure or an over-the-air procedure.

The present disclosure also relates to a wireless communication method for use in a wireless network node, comprising: receiving, from a wireless terminal, a message comprising a concealed identifier for a registration procedure, determining a permanent identifier and a check value based on the concealed identifier, and transmitting, to the wireless terminal, a response based on determining whether the permanent identifier is stored in the wireless network node and whether the check value is equal to a check value corresponding to the permanent identifier.

Various embodiments may preferably implement the following features:

A cipher value text of the concealed identifier may be determined based on the check value.

The cipher value text of the concealed identifier may be an encryption of a mobile subscriber identification number, MSIN, of the wireless terminal and the check value.

The permanent identifier may be a subscription permanent identifier.

The check value may be a check value of verifying one of an International mobile subscriber identity, IMSI, of the wireless terminal or a mobile subscriber identification number, MSIN, of the The wireless communication method may further comprise updating the check value by using a unified data management control plane procedure or an over-the-air procedure.

The response may indicate that the registration procedure fails when the permanent identifier is not stored in the wireless network node or the check value is different from the check value corresponding to the permanent identifier.

The response may indicate that the registration procedure was successful when the permanent identifier is stored in the wireless network node and the check value is equal to the check value corresponding to the permanent identifier.

The present disclosure also relates to a wireless terminal, comprising: a processor, configured to determine a concealed identifier based on a permanent identifier and a check value; and a communication unit, configured to transmit a message comprising the concealed identifier for a registration procedure to a wireless network node.

Various embodiments may preferably implement the following features:

The processor may be configured to perform the wireless communication method recited in any of the foregoing described methods.

The present disclosure also relates to a wireless network node, comprising: a communication unit, configured to receiving a message comprising a concealed identifier for a registration procedure from a wireless terminal, and determine a permanent identifier and a check value based on the concealed identifier, wherein the communication unit is further configured to transmit a response to the wireless terminal based on determining whether the permanent identifier is stored in the wireless network node and whether the check value is equal to a check value corresponding to the permanent identifier.

Various embodiments may preferably implement the following features:

The processor may be configured to perform the wireless communication method of any of the foregoing described methods.

The present disclosure also relates to a computer program product comprising a computer-readable program medium code stored thereupon, the code, when executed by a processor, causing the processor to implement a wireless communication method recited in any of foregoing described methods.

The exemplary embodiments disclosed herein are directed to providing features that will become readily apparent by reference to the following description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

BRIEF DESCRIPTION OF DRAWINGS

The above and other aspects and their implementations are described in greater detail in the drawings, the descriptions, and the claims.

DETAILED DESCRIPTION

Figure 1:
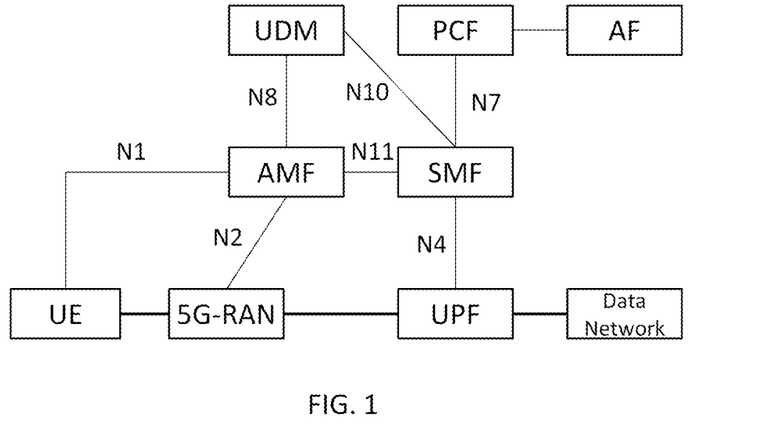
FIG. 1 shows a schematic architecture of a 5G system.

FIG. 1 relates to a schematic architecture of a 5G system. The 5G system architecture consists of the following network functions (NF). The Access and Mobility Management function (AMF) including functionalities such as: UE mobility management, reachability management, connection management, etc. The AMF terminates the radio access network (RAN) control plane (CP) interface (i.e. N2 shown in FIG. 1) and non-access stratum (NAS) (i.e. N1 shown in FIG. 1), NAS ciphering and integrity protection. It also distributes the Session Management (SM) NAS to the proper session management functions (SWIFs) via N11 interface.

The Session Management function (SMF) includes: UE internet protocol (IP) address allocation & management, selection and control of user plane (UP) function, protocol data unit (PDU) connection management, etc.

The User plane function (UPF) is the anchor point for Intra-/Inter-radio access technology (RAT) mobility and the external PDU session point of interconnect to the data network. The UPF also routes and forwards the data packet as the indication from the SMF. In addition, the UPF buffers the DL data when the UE is in idle mode.

The Unified Data Management (UDM) stores the subscription profile for the UEs. ARPF (not shown) is an Authentication credential Repository and Processing Function. The UDM and ARPF belong to the home network and are implemented together.

The Policy Control Function (PCF) generates the police to govern network behaviour based on the subscription and indication from AF (Application Function). It also provides policy rules to CP function (AMF and SMF) to enforce them.

Figure 2:
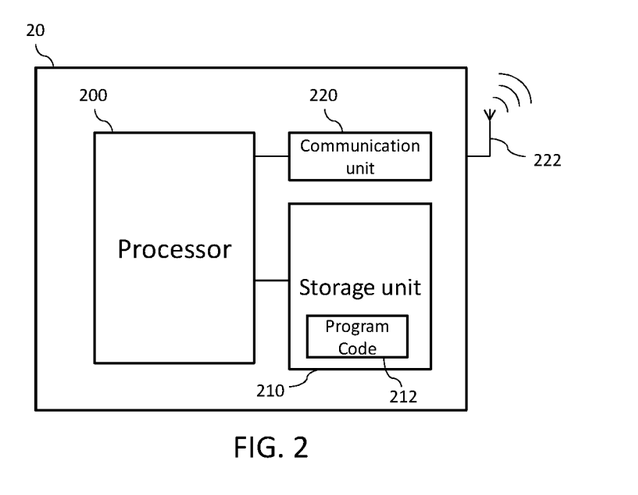
FIG. 2 shows an example of a schematic diagram of a network device according to an embodiment of the present disclosure.

FIG. 2 relates to a schematic diagram of a wireless terminal 20 according to an embodiment of the present disclosure. The wireless terminal 20 may be a user equipment (UE), a mobile phone, a laptop, a tablet computer, an electronic book or a portable computer system and is not limited herein. The wireless terminal 20 may include a processor 200 such as a microprocessor or Application Specific Integrated Circuit (ASIC), a storage unit 210 and a communication unit 220. The storage unit 210 may be any data storage device that stores a program code 212, which is accessed and executed by the processor 200. Embodiments of the storage unit 212 include but are not limited to a subscriber identity module (SIM), read-only memory (ROM), flash memory, random-access memory (RAM), hard-disk, and optical data storage device. The communication unit 220 may a transceiver and is used to transmit and receive signals (e.g. messages or packets) according to processing results of the processor 200. In an embodiment, the communication unit 220 transmits and receives the signals via at least one antenna 222 shown in FIG. 2.

In an embodiment, the storage unit 210 and the program code 212 may be omitted and the processor 200 may include a storage unit with stored program code.

The processor 200 may implement any one of the steps in exemplified embodiments on the wireless terminal 20, e.g., by executing the program code 212.

The communication unit 220 may be a transceiver. The communication unit 220 may as an alternative or in addition be combining a transmitting unit and a receiving unit configured to transmit and to receive, respectively, signals to and from a wireless network node (e.g. a base station).

Figure 3:
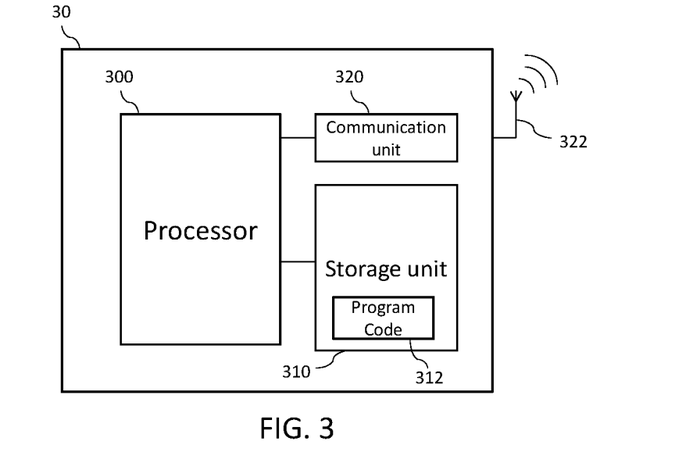
FIG. 3 shows an example of a schematic diagram of a network node according to an embodiment of the present disclosure.

FIG. 3 relates to a schematic diagram of a wireless network node 30 according to an embodiment of the present disclosure. The wireless network node 30 may be a base station (BS), a network entity, a Mobility Management Entity (MME), Serving Gateway (S-GW), Packet Data Network (PDN) Gateway (P-GW), or Radio Network Controller (RNC), and is not limited herein. In an embodiment, the wireless network node 30 may be the 5G-RAN, the AMF, the UDM, the PCF, the SMF and/or the UPF shown in FIG. 1. The wireless network node 30 may include a processor 300 such as a microprocessor or ASIC, a storage unit 310 and a communication unit 320. The storage unit 310 may be any data storage device that stores a program code 312, which is accessed and executed by the processor 300.

Examples of the storage unit 312 include but are not limited to a SIM, ROM, flash memory, RAM, hard-disk, and optical data storage device. The communication unit 320 may be a transceiver and is used to transmit and receive signals (e.g. messages or packets) according to processing results of the processor 300. In an example, the communication unit 320 transmits and receives the signals via at least one antenna 322 shown in FIG. 3.

In an embodiment, the storage unit 310 and the program code 312 may be omitted. The processor 300 may include a storage unit with stored program code.

The processor 300 may implement any steps described in exemplified embodiments on the wireless network node 30, e.g., via executing the program code 312.

The communication unit 320 may be a transceiver. The communication unit 320 may as an alternative or in addition be combining a transmitting unit and a receiving unit configured to transmit and to receive, respectively, signals to and from a wireless terminal (e.g. a user equipment).

Figure 4:
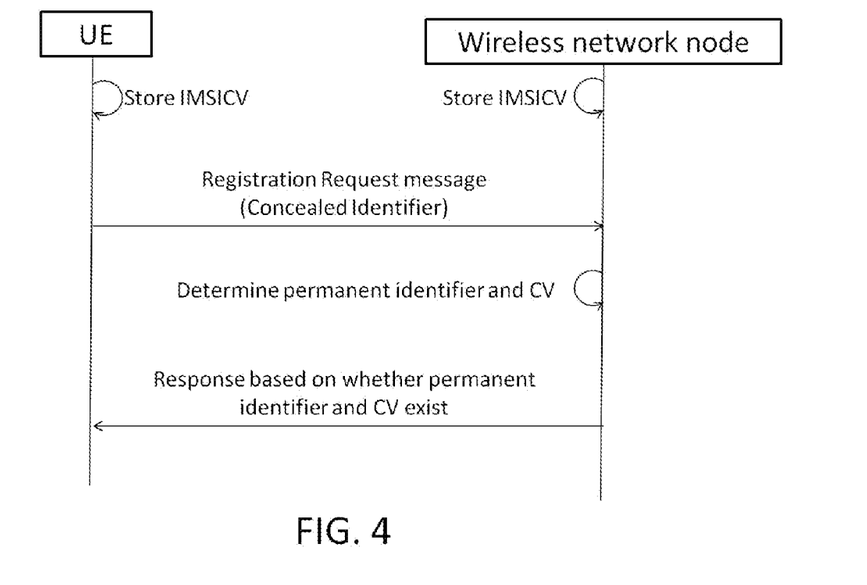
FIG. 4 shows a schematic diagram of a process according to an embodiment of the present disclosure.

FIG. 4 shows a schematic diagram of a process according to an embodiment of the present disclosure. In this embodiment, the user equipment (UE) determines a concealed identifier based on a stored permanent identifier and a check value, i.e. an International mobile subscriber identity, IMSI and a check value (IMSICV) and transmits a message (Registration Request message) comprising the concealed identifier for a registration procedure to the wireless network node (e.g. the UDM shown in FIG. 1).

As shown in FIG. 4 the wireless network node receives the message comprising the concealed identifier for a registration procedure and subsequently determines a permanent identifier and a check value, i.e. the IMSICV, based on the concealed identifier, and thereupon transmits a response to the UE based on determining whether the permanent identifier is stored in the wireless network node and whether the check value is equal to a check value corresponding to the permanent identifier.

In an embodiment, when the wireless network node determines the permanent identifier is stored in, e.g., a database of, the wireless network node and the check value is equal to a check value corresponding to the permanent identifier, the response indicate the registration procedure was successful.

In an embodiment, when the wireless network node determines the permanent identifier is not stored in the wireless network node and/or the check value is not equal to the check value corresponding to the permanent identifier, the response indicate the registration procedure fails.

In an embodiment, the UE and/or the wireless network node updates the check value by using a unified data management control plane procedure and/or an over-the-air (OTA) procedure.

Figure 5:
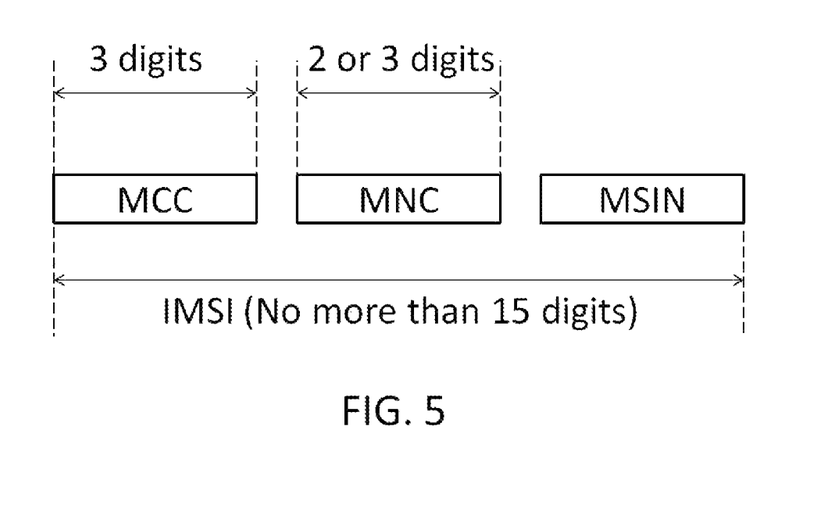
FIG. 5 shows a structure of the International mobile subscriber identity, IMSI.

FIG. 5 shows a structure of the IMSI. According to an embodiment, the IMSI comprises a Mobile Country Code (MCC) consisting of three digits. The MCC identifies uniquely the country of domicile of the mobile subscription. The IMSI further comprises a Mobile Network Code (MNC) consisting of two or three digits for 3GPP network applications. The MNC identifies the home PLMN (Public Land Mobile Network) of the mobile subscription. The length of the MNC (two or three digits) depends on the value of the MCC. A mixture of two and three digit MNC codes within a single MCC area is possible but not necessarily recommended. Moreover, the IMSI comprises a Mobile Subscriber Identification Number (MSIN) identifying the mobile subscription within a PLMN.

Figure 6:
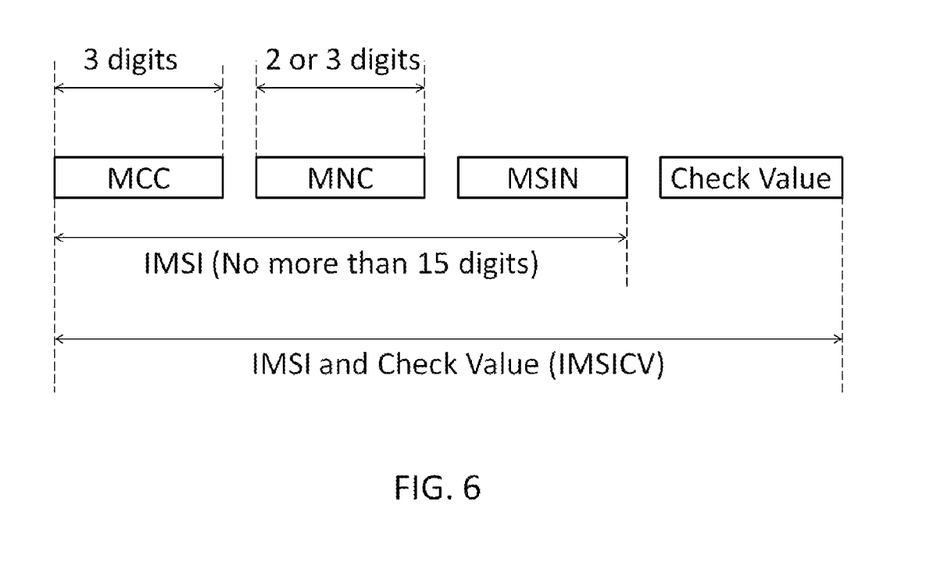
FIG. 6 shows a structure of the IMSI and Check Value, IMSICV.

FIG. 6 shows a structure of the IMSI and Check Value (IMSICV). According to an embodiment, the IMSICV comprises the respective features of the IMSI as described with reference to FIG. 5, namely a Mobile Country Code (MCC), a Mobile Network Code (MNC) and a Mobile Subscriber Identification Number (MSIN). In addition, as shown in FIG. 6, the check value is used to verify the validity of the IMSI or MSIN. The length of the check value depends on the network operator. The check value may be updated by the home network through the OTA and/or a UE parameter update.

Figure 7:
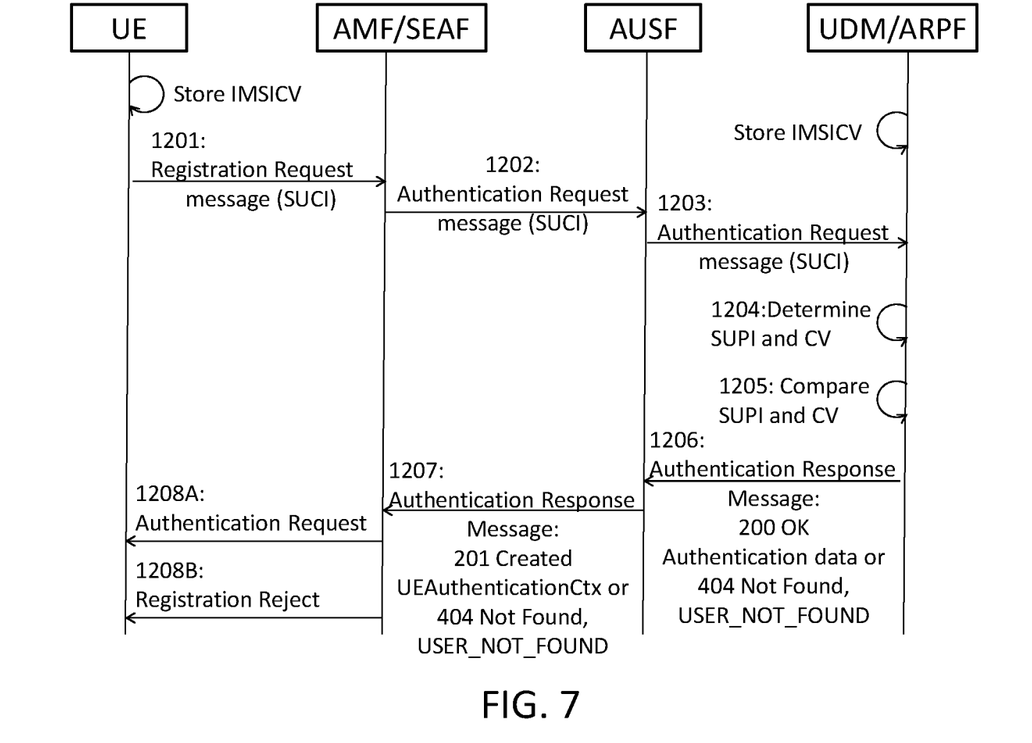
FIG. 7 shows a schematic diagram of a process according to an embodiment of the present disclosure.

FIG. 7 shows a schematic diagram of a process according to an embodiment of the present disclosure. In this embodiment, the IMSICV are stored at the UE and the UDM/ARPF. At step 1201 the UE sends the Registration Request message to the AMF/SEAF (security anchor function, which is collocated with the AMF) containing the SUCI (Subscription Concealed Identifier) (i.e. the concealed identifier in FIG. 4), which will be described in more detail below. The SUCI includes a SUPI Type, a Home Network Identifier, a Routing Indicator, a Protection Scheme Identifier, a Home Network Public Key Identifier and a Scheme Output. The cipher value text in the Scheme Output is the encryption of the MSIN and the check value.

At step 1202 the SEAF invokes the Nausf_UEAuthentication service by sending a Nausf_UEAuthentication_Authenticate Request message containing the SUCI to the AUSF.

At step 1203 the Nudm_UEAuthentication_Get Request containing SUCI is sent from AUSF to UDM.

Upon reception of the Nudm_UEAuthentication_Get Request, at step 1204 the UDM invokes SIDF (Subscriber Identity De-concealing Function) to de-conceal the SUCI to obtain (e.g. determine) the SUPI and the check value. At step 1205, the UDM determines whether the SUPI is stored in the database. If the SUPI is found in the database of the UDM, the UDM determines whether the check value is stored in the database as well.

If SUPI and check value are both found in the database of the UDM, the UDM selects the authentication method according to the SUPI. Then, the UDM generates the authentication data including authentication vector and at step 1206 sends it to AUSF in the Nudm_UEAuthentication_Get Response message with "200 OK". If SUPI or Check Value are not found in the database, the UDM at step 1206 returns "404 Not Found" with "USER_NOT_FOUND" in the Nudm_UEAuthentication Get_Response message.

Upon reception of "200 OK", at step 1207, the AUSF sends "201 Created" to AMF/SEAF with UEAuthenticationCtx containing authentication vector in the Nausf_UEAuthentication_Authenticate Response message. Upon reception of "404 Not Found", the AUSF sends "404 Not Found" to AMF/SEAF with "USER_NOT_FOUND" at step 1207.

Finally, at step 1208A the AMF/SEAF sends RAND and AUTN to the UE in the Authentication Request message in the case of "201 Created". Otherwise, at step 1208B the AMF/SEAF sends the Registration Reject message with Cause# 3 to the UE in the case of "404 Not Found".

In other words, FIG. 7 relates to a procedure of preventing Subscription Permanent Identifier from brute-force attacks. The SUPI and Check Value both are stored in UE and the home network, respectively. The UE derives (e.g. determine) the SUCI through encrypting the SUPI and check value, and sends the SUCI to the home network. Next, the home network decrypts the SUCI to obtain the SUPI and the check value, and determines whether the SUPI is stored in the database. If the SUPI is found in the database of the UDM, the UDM determines whether the check value is stored in the database. If there are both the SUPI and the check value in the database of the UDM, the home network returns a successful response to the UE. If one of the SUPI or the check value is not found in the data base of the UDM, the home network returns a failure response to the UE.

The aforementioned SUPI is a globally unique 5G Subscription Permanent Identifier allocated to each subscriber in the 5G System. The SUPI is defined as:
- a SUPI type: in this release of the specification, it may indicate an IMSI or a network specific identifier; and dependent on the value of the SUPI type:
  - an IMSI; or
  - a network specific identifier, taking the form of a Network Access Identifier (NAI).

Figure 8:
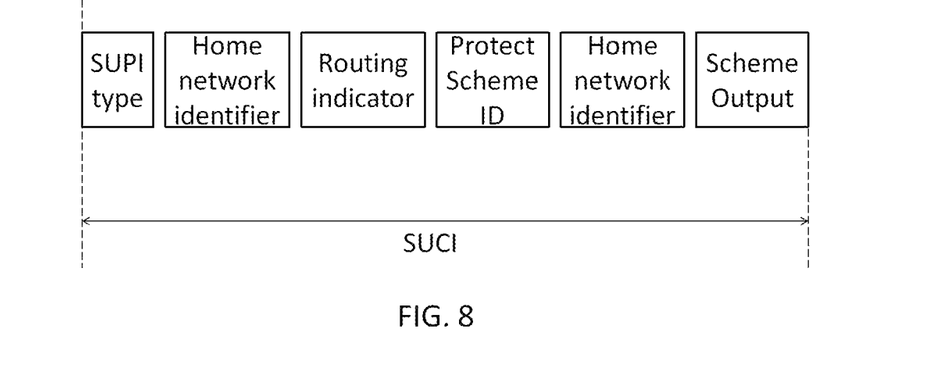
FIG. 8 shows a structure of a Subscription Concealed Identifier, SUCI.

FIG. 8 shows a structure of a Subscription Concealed Identifier (SUCI). The SUCI is a privacy preserving identifier containing the concealed SUPI.

The SUCI comprises a SUPI Type, consisting of a value in the range 0 to 7. It identifies the type of the SUPI concealed in the SUCI. The following values are defined:
0: IMSI
1: Network Specific Identifier
2 to 7: spare values for future use.

The SUCI further comprises Home Network Identifier, identifying the home network of the subscriber. When the SUPI Type is an IMSI, the Home Network Identifier is composed of two parts:
- Mobile Country Code (MCC), consisting of three decimal digits. The MCC identifies uniquely the country of domicile of the mobile subscription; and
- Mobile Network Code (MNC), consisting of two or three decimal digits. The MNC identifies the home PLMN of the mobile subscription.

When the SUPI type is a Network Specific Identifier, the Home Network Identifier consists of a string of characters with a variable length representing a domain name.

The SUCI further comprises a Routing Indicator, consisting of 1 to 4 decimal digits assigned by the home network operator and provisioned in the USIM, that allows together with the Home Network Identifier to route network signalling with SUCI to AUSF and UDM instances capable to serve the subscriber.

Each decimal digit present in the Routing Indicator shall be regarded as meaningful (e.g. value "012" is not the same as value "12"). If no Routing Indicator is configured on the USIM, this data field shall be set to the value 0 (i.e. only consist of one decimal digit of "0").

The SUCI further comprises a Protection Scheme Identifier, consisting of a value in the range of 0 to 15. It represents the null-scheme or a non-null-scheme or a protection scheme specified by the HPLMN.

In addition, the SUCI further comprises a Home Network Public Key Identifier, consisting in a value in the range 0 to 255. It represents a public key provisioned by the HPLMN and it is used to identify the key used for SUPI protection. In case of null-scheme being used, this data field shall be set to the value 0.

The SUCI further comprises a Scheme Output, consisting of a string of characters with a variable length or hexadecimal digits, dependent on the used protection scheme. It represents the output of a public key protection scheme or the output of a protection scheme specified by the HPLMN.

Figure 9:
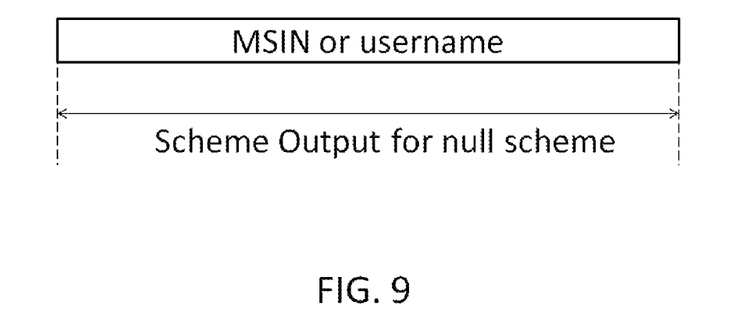
FIG. 9 shows a scheme output for the null-scheme.

FIG. 9 shows a scheme output for the aforementioned null-scheme. The Mobile Subscriber Identification Number (MSIN) or the username identifies the mobile subscription within the Home Network. The scheme output is formatted as a variable length of characters.

Figure 10:
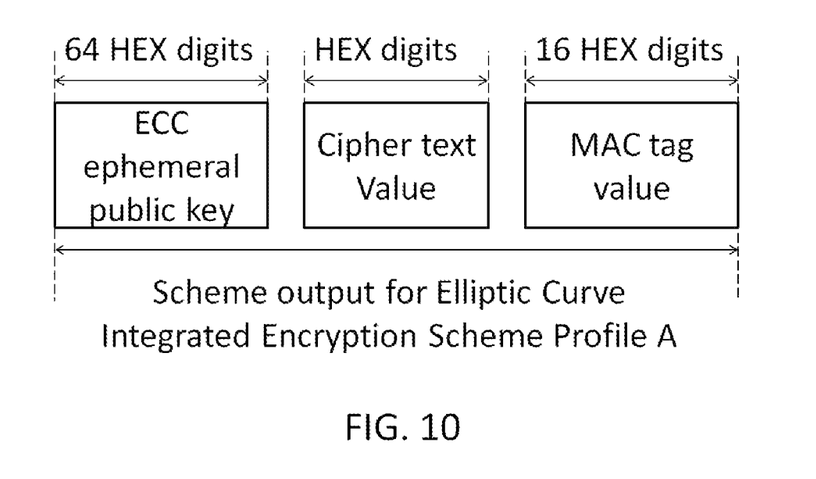
FIG. 10 shows a scheme output for the Elliptic Curve Integrated Encryption Scheme Profile A.

FIG. 10 shows a scheme output for the Elliptic Curve Integrated Encryption Scheme Profile A. The ECC ephemeral public key is formatted as 64 hexadecimal digits, which allows to encode 256 bits. The cipher text value is formatted as a variable length of hexadecimal digits. The MAC tag value is formatted as 16 hexadecimal digits, which allows to encode 64 bits.

Figure 11:
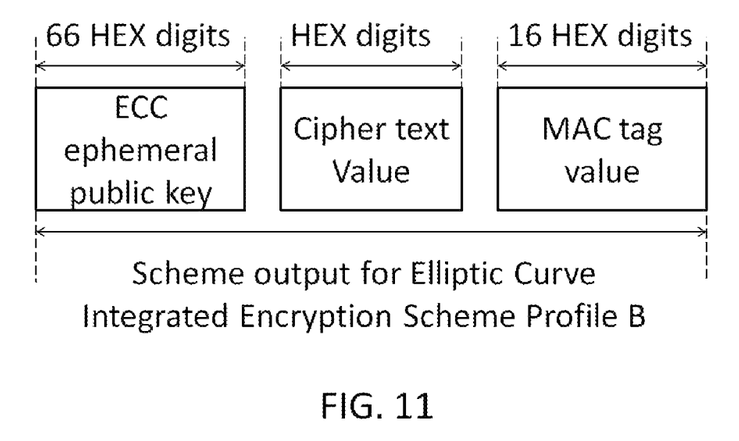
FIG. 11 shows a scheme output for the Elliptic Curve Integrated Encryption Scheme Profile B.

FIG. 11 shows a scheme output for the Elliptic Curve Integrated Encryption Scheme Profile B. The ECC ephemeral public key is formatted as 66 hexadecimal digits, which allows to encode 264 bits. The cipher text value is formatted as a variable length of hexadecimal digits. The MAC tag value is formatted as 16 hexadecimal digits, which allows to encode 64 bits.

Figure 12:
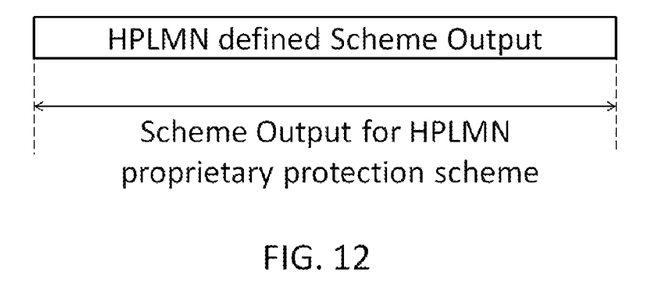
FIG. 12 shows a scheme output for HPLMN proprietary protection schemes.

FIG. 12 shows a scheme output for HPLMN proprietary protection schemes. The HPLMN defined scheme output is formatted as a variable length of hexadecimal digits. As examples, assuming the IMSI 234150999999999, where MCC=234, MNC=15 and MSIN=0999999999, CV=88888, the Routing Indicator 678, and a Home Network Public Key Identifier of 27:
- the SUCI for the null-scheme is composed of: 0, 234, 15, 678, 0, 0 and 0999999999
- the SUCI for the Profile <A>protection scheme is composed of: 0, 234, 15, 678, 1, 27, <EEC ephemeral public key value>, <encryption of 099999999988888>and <MAC tag value>

When the SUPI is defined as a Network Specific Identifier, the SUCI shall take the form of a Network Access Identifier (NAI). In this case, the NAI format of the SUCI shall have the form username@realm, where the realm part shall be identical to the realm part of the Network Specific Identifier.

When the SUPI is defined as an IMSI, the SUCI in NAI format shall have the form username without a realm part.

The username part of the NAI shall take one of the following forms:
a) for the null-scheme:
  type<supi type>sid<routing indicator>.schid<protection scheme id>.userid<MSIN or Network Specific Identifier SUPI username>
b) for the Scheme Output for Elliptic Curve Integrated Encryption Scheme Profile A and Profile B:
  type<supi type>.rid<routing indicator>.schid<protection scheme id>.hnkey<home network public key id>.ecckey<ECC ephemeral public key value>.cip<ciphertext value>.mac<MAC tag value>
c) for HPLMN proprietary protection schemes:
  type<supi type>.rid<routing indicator>.schid<protection scheme id>.hnkey<home network public key id>.out<HPLMN defined scheme output>

Next some examples are provided:
Assuming the IMSI 234150999999999, where MCC=234, MNC=15 and MSIN=0999999999, CV=88888, the Routing Indicator 678, and a Home Network Public Key Identifier of 27, the NAI format for the SUCI takes the form:
for the null-scheme:
type0.rid678.schid0.userid0999999999
for the Profile <A>protection scheme:
type0sid678.schid1.hnkey27.ecckey<ECC ephemeral public key>.cip<encryption of 099999999988888>.mac<MAC tag value>

Assuming the Network Specific Identifier user17@example.com, the Routing Indicator 678, and a Home Network Public Key Identifier of 27, the NAI format for the SUCI takes the form:

for the null-scheme:
type1.rid678.schid0.useriduser17@example.com
for the Profile <A>protection scheme:
type1.rid678.schid1.hnkey27.ecckey<ECC ephemeral public key>.cip<encryption of user17>.mac<MAC tag value>@example.com While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A skilled person would further appreciate that any of the various illustrative logical blocks, units, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software unit"), or any combination of these techniques.

To clearly illustrate this interchangeability of hardware, firmware and software, various illustrative components, blocks, units, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, unit, etc. can be configured to perform one or more of the functions described herein. The term "configured to" or "configured for" as used herein with respect to a specified operation or function refers to a processor, device, component, circuit, structure, machine, unit, etc. that is physically constructed, programmed and/or arranged to perform the specified operation or function.

Furthermore, a skilled person would understand that various illustrative logical blocks, units, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, units, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein. If implemented in software, the functions can be stored as one or more instructions or code on a computer-readable medium. Thus, the steps of a method or algorithm disclosed herein can be implemented as software stored on a computer-readable medium.

Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "unit" as used herein, refers to software, firmware, hardware, and any combination of these elements for performing the associated functions described herein. Additionally, for purpose of discussion, the various units are described as discrete units; however, as would be apparent to one of ordinary skill in the art, two or more units may be combined to form a single unit that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A wireless communication method for use in a wireless terminal, comprising:
   determining a concealed identifier based on a permanent identifier and a check value;
   transmitting, to a wireless network node, a message comprising the concealed identifier for a registration procedure; and
   updating the check value by using a unified data management control plane procedure,
   wherein the check value is a check value of verifying one of an International mobile subscriber identity (IMSI) of the wireless terminal or a mobile subscriber identification number (MSIN) of the IMSI.

2. The wireless communication method of claim 1, wherein a cipher value text of the concealed identifier is determined based on the check value.

3. The wireless communication method of claim 2, wherein the cipher value text of the concealed identifier is an encryption of a mobile subscriber identification number, MSIN, of the wireless terminal and the check value.

4. The wireless communication method of claim 1, wherein the permanent identifier is a subscription permanent identifier.

5. A wireless communication method for use in a wireless network node, comprising:
   receiving, from a wireless terminal, a message comprising a concealed identifier for a registration procedure;
   determining a permanent identifier and a check value based on the concealed identifier;
   transmitting, to the wireless terminal, a response based on determining whether the permanent identifier is stored in the wireless network node and whether the check value is equal to a check value corresponding to the permanent identifier; and
   updating the check value by using a unified data management control plane procedure,
   wherein the check value is a check value of verifying one of an International mobile subscriber identity (IMSI) of the wireless terminal or a mobile subscriber identification number (MSIN) of the IMSI.

6. The wireless communication method of claim 5, wherein a cipher value text of the concealed identifier is determined based on the check value.

7. The wireless communication method of claim 6, wherein the cipher value text of the concealed identifier is an encryption of a mobile subscriber identification number (MSIN) of the wireless terminal and the check value.

8. The wireless communication method of claim 5, wherein the permanent identifier is a subscription permanent identifier.

9. The wireless communication method of claim 5, wherein the response indicates that the registration procedure fails when the permanent identifier is not stored in the wireless network node or the check value is different from the check value corresponding to the permanent identifier.

10. The wireless communication method of claim 5, wherein the response indicates that the registration procedure was successful when the permanent identifier is stored in the wireless network node and the check value is equal to the check value corresponding to the permanent identifier.

11. A wireless terminal, comprising:
   a processor, configured to determine a concealed identifier based on a permanent identifier and a check value and update the check value by using a unified data management control plane procedure; and
   a communication unit, configured to transmit a message comprising the concealed identifier for a registration procedure to a wireless network node,
   wherein the check value is a check value of verifying one of an International mobile subscriber identity (IMSI) of the wireless terminal or a mobile subscriber identification number (MSIN) of the IMSI.

12. The wireless terminal of claim 11, wherein the processor is further configured to determine a cipher value text of the concealed identifier based on the check value.

13. The wireless terminal of claim 12, wherein the cipher value text of the concealed identifier is an encryption of a mobile subscriber identification number (MSIN) of the wireless terminal and the check value.

14. A wireless network node, comprising:
   a communication unit, configured to receive a message comprising a concealed identifier for a registration procedure from a wireless terminal; and
   a processor, configured to determine a permanent identifier and a check value based on the concealed identifier, wherein the communication unit is further configured to transmit a response to the wireless terminal based on determining whether the permanent identifier is stored in the wireless network node and whether the check value is equal to a check value corresponding to the permanent identifier, and wherein the processor is further configured to update the check value by using a unified data management control plane procedure,
   wherein the check value is a check value of verifying one of an International mobile subscriber identity (IMSI) of the wireless terminal or a mobile subscriber identification number (MSIN) of the IMSI.

15. The wireless network node of claim 14, wherein a cipher value text of the concealed identifier is determined based on the check value.

16. The wireless network node of claim 15, wherein the cipher value text of the concealed identifier is an encryption of a mobile subscriber identification number (MSIN) of the wireless terminal and the check value.

* * * * *